Patented Sept. 18, 1923.

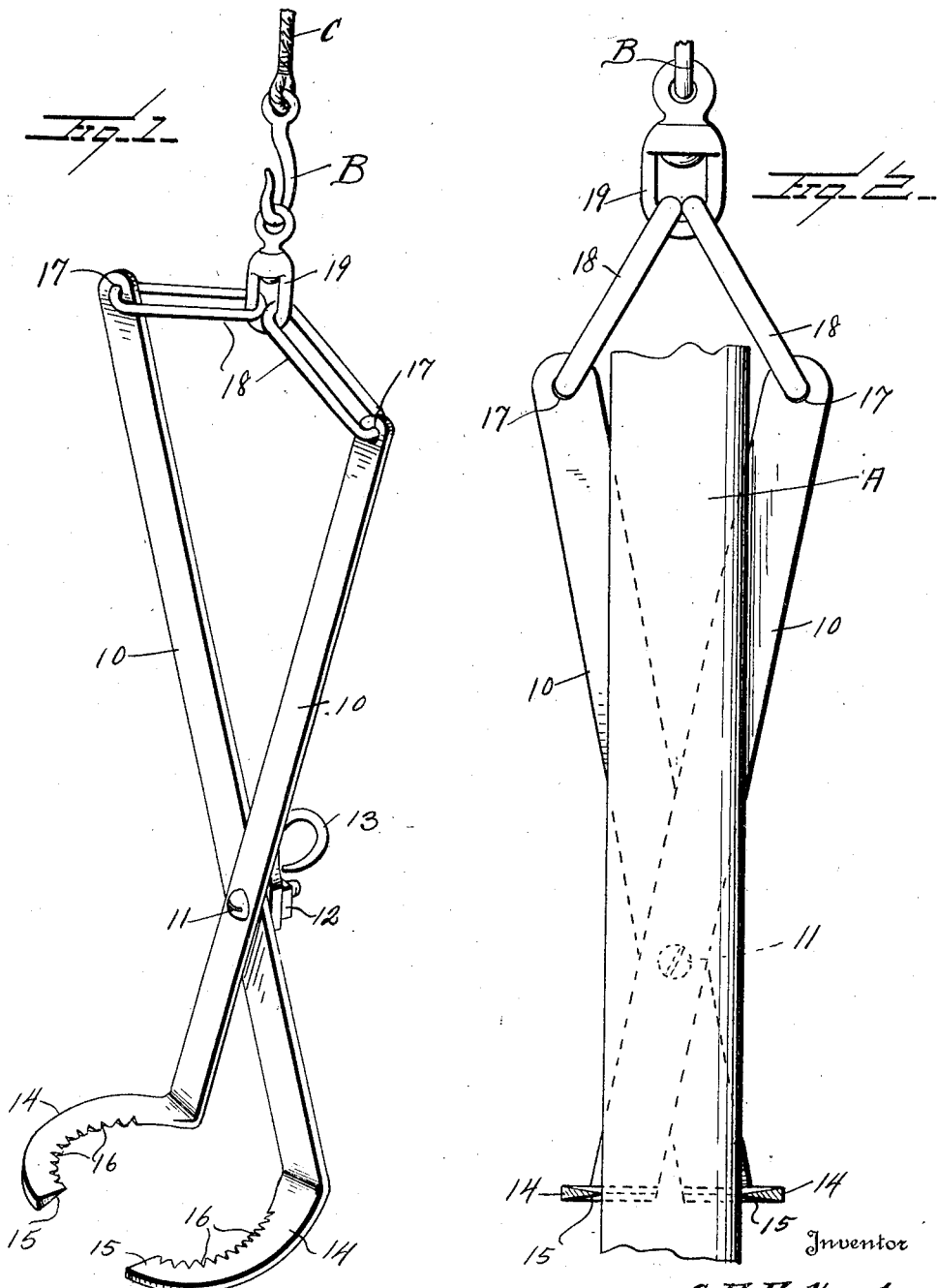

1,468,344

UNITED STATES PATENT OFFICE.

CARL E. ECKERT, OF MASON, TEXAS.

PIPE LIFTER.

Application filed September 6, 1922. Serial No. 586,518.

*To all whom it may concern:*

Be it known that CARL E. ECKERT, a citizen of the United States, residing at Mason, in the county of Mason and State of Texas, has invented certain new and useful Improvements in Pipe Lifters, of which the following is a specification, reference being had to the accompanying drawings.

This invention relates to pipe lifters and has for its object the provision of a novel tool designed to be engaged upon well pipes for the purpose of lifting them when removal is necessary.

An important object is the provision of a tool of this character in which the construction is such that the tool may be slid down along the pipe to any desired point, the device including jaws which will automatically grip the pipe when an upward pull is applied, the tool being designed particularly for use in connection with block and tackle for applying the necessary power.

Another object is the provision of a tool of this character which will be very simple and inexpensive in manufacture, easy to use, efficient and durable in service and a general improvement in the art.

With the above and other objects and advantages in view the invention consists in the details of construction to be hereinafter more fully described and claimed and illustrated in the accompanying drawings in which:

Figure 1 is a perspective view of the device in open position; and

Figure 2 is a view showing it in closed position and engaged upon a pipe.

Referring more particularly to the drawings, I have shown my device as comprising a pair of elongated lever members 10 pivotally connected near their lower ends by a bolt or the like 11 carrying a nut 12. This bolt also passes through the shank or base of a hook or eye member 13. The lower ends of the levers 10 are formed with lateral extensions 14 which are arcuate in shape and which consitute jaws. The concave or confronting edges of these jaws are thinned as indicated at 15 and notched or toothed as shown at 16 whereby to be capable of more or less biting engagement upon a pipe A to be lifted.

The upper ends of the levers are formed with holes 17 within which are engaged the links 18 in turn engaged within a swivel loop 19 with which is connected a hook B or the like carried by a hoisting cable C.

In the use of the device the levers are swung apart to separate the jaws 14 so that they may be engaged upon the pipe to be lifted. The device is then lowered into the well and will slide freely along the pipe until the desired point is reached. When the hoisting mechanism is then set in operation the upward strain on the swivel loop 19 will bring the links 18 together and consequently swing the levers upon their pivot so that the jaws 14 will bindingly engage the pipe. As a continued pull is exerted by the hoisting mechanism the pipe will be lifted and may be held by any suitable means while the tool is again slid downwardly to get another grip. The number of steps of this operation required will, of course, depend upon the length of the pipe.

It is conceivable that the device is capable of limited use as a fishing tool. When employed in this capacity it is apparent that a suitable line may be connected with the hook or eye 13 to enable the device to be lowered into a well. When this is done it is apparent that no strain must be applied to the cable C so that the weight of the lever arms 10, the links 18 and the swivel head 19 will operate to swing the upper ends of the levers apart so that the jaws 14 will remain separated, and capable of being slid over a pipe to be pulled from the well. When the device has been thus lowered to the desired point a pull is exerted upon the cable C which will result in drawing the upper ends of the levers together and correspondingly moving the lower ends so that the toothed arcuate edges thereof will bitingly engage the pipe and hold it firmly so that extraction may be accomplished.

From the foregoing description and a study of the drawings it will be apparent that I have thus provided a simply constructed and consequently inexpensive tool which will be efficient in use and which will effect a saving in time and labor. Owing to the simplicity of the construction and the fewness of the parts it is apparent that there is nothing to get out of order so that the device should have a long life and satisfactorily perform all of its functions.

While I have shown and described the preferred embodiment of the invention, it is, of course, to be understood that I reserve the right to make such changes in the form, construction and arrangement of parts as will not depart from the spirit of the invention or the scope of the subjoined claims.

Having thus described my invention, I claim:

1. A lifting tongs of the character described comprising a pair of elongated levers pivoted in crossed relation and terminating at their lower ends in laterally extending arcuate jaws having their confronting faces sharpened to an edge and toothed, and means connected with the upper ends of the levers for drawing them together.

2. A tongs of the character described comprising a pair of elongated levers pivoted in crossed relation and connected at their upper ends by hoisting means, the lower ends of the levers terminating in lateral clamping jaws, and a hook mounted upon the pivotal connection of the levers and adapted for connection with a suspension element usable independently of said hoisting device, said pivot point being located nearer the lower ends of the levers than the upper ends, whereby said upper ends will overbalance the lower ends and will hold the jaws normally separated when the suspension is effected from said hook and the hoisting means is inoperative.

In testimony whereof I hereunto affix my signature.

CARL E. ECKERT.